Patented Aug. 30, 1932

1,874,655

UNITED STATES PATENT OFFICE

EDMOND T. TISZA AND BERNARD JOOS, OF YONKERS, NEW YORK, ASSIGNORS TO THE PYRIDIUM CORPORATION, OF NEPERA PARK, NEW YORK, A CORPORATION OF NEW YORK

BETA (PARA-ARSONIC ACID PHENYL AZO) ALPHA ALPHA DIAMINO PYRIDINE AND THE PROCESS OF MAKING IT

No Drawing.  Application filed May 7, 1929. Serial No. 361,265.

This invention relates to arsonic-acid substitution products of phenyl-azo-alpha-alpha-diamino-pyridine, and to methods of obtaining same.

One of the primary objects of the invention is the provision of a method of obtaining an arsenic compound capable of use for medicinal purposes, and as a starting material for the production of new substances.

The improved compounds of which para-arsonic-acid-phenyl-azo-alpha-alpha-diaminopyridine is the base, are preferably obtained, by first producing a hydrochloric salt, which may be obtained by diazotizing p-amino-phenyl-arsonic-acid (p-arsanilic acid) in the presence of hydrochloric acid. The diazotized solution is then coupled with alpha-alpha-diaminopyridine in the presence of hydrochloric acid.

The hydrochloride so obtained is a bright red colored micro-crystalline powder. It melts with decomposition at about 262° C., and is slightly soluble in hot or cold water with a reddish orange color, and in methyl alcohol, but is insoluble in ether, chloroform, acetone and toluol.

The base of this compound, that is, para-arsonic-acid-phenyl-azo-alpha-alpha-diaminopyridine has an amphoteric character. That is, it is able to build salts with acids or alkalies. An alkaline salt, as for instance, the sodium salt, may be produced from the hydrochloride, by adding to the aqueous solution thereof a suitable alkali, as for instance, sodium hydroxide. The alkali first neutralizes the loosely bound acid and precipitates the free base, that is, the para-arsonic-acid-phenyl - azo-alpha - alpha - diaminopyridine. Further addition of the alkali dissolves the precipitate. That is, the alkali salt is formed.

When the sodium salt in solution is treated with an excess of concentrated sodium hydroxide solution, the sodium salt is precipitated in micro-crystalline form. This salt is yellow colored, does not melt at 275° C., is soluble in methyl alcohol, and insoluble in ether, chloroform, acetone, or toluol.

The free base, that is, the para-arsonic-acid-phenyl-azo - alpha - alpha - diaminopyridine, may be obtained either from the sodium salt solution by precipitation with an acid, or from the hydrochloric salt solution, by precipitation with an alkali, in the form of a yellow powder.

An example of the method of preparation is given below, the first step being the preparation of the hydrochloride.

Example

The p-amino-phenyl-arsonic-acid (p-arsanilic acid) to the amount of 10 gms. is dissolved in 24 cc. hydrochloric acid, and 35 cc. of distilled water. After cooling down to 14° C., it is diazotized with 3.2 gms. of sodium nitrite dissolved in 20 cc. of water. To the diazotized solution is added a solution of 4.4 gms. alpha-alpha-diaminopyridine in 30 cc. hydrochloric acid of 8.5%. Copulation takes place at once, and after standing for one hour, the precipitate is collected on a suction filter, washed with water, and dried in a vacuum desiccator.

From the hydrochloric salt so prepared, the sodium salt may be obtained as above described, by adding to the aqueous solution a suitable alkali, as for instance, sodium hydroxide. The alkali first neutralizes the loosely bound acid, and precipitates the free base, that is, the para-arsonic-acid-phenyl-azo-alpha-alpha-diaminopyridine. Further addition of the alkali dissolves the precipitate. That is, the alkali salt is formed.

The free base may be obtained either from the sodium salt solution by precipitation with an acid, or from the hydrochloric salt solution, by precipitation with an alkali, in the form of a yellow powder.

Since the formula for phenyl-azo-alpha-alpha-diaminopyridine is:

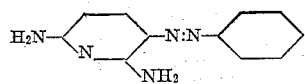

and as this compound is obtained through diazotization of p-arsanilic acid, and coupling the diazotized acid and alpha-alphadiaminopyridine, the formula of the base must be the following:—

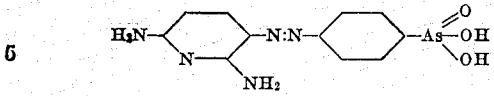

In the above formulas, the beta position in the pyridine nucleus is indicated as the place for the copulation. In general, the azo group will go into para position to the amino group, or into the ortho position, if the para position is occupied. In the present instance, the azo group is in the para position to one amino group, and in the ortho position to the other amino group. The new compounds then will be para-arsonic-acid-phenyl-azo-alpha-alpha-diaminopyridine, its acid or alkali salts. There is a possibility that some of the gamma-azo-compounds is formed, and that this isomer is present in the above described preparations. However, if present, it is in a very small amount.

While this compound does not display marked bactericidal action in vitro, it may be used for medicinal purposes, and it is of especial advantage as a starting material for the production of new substances. Such new substances may also be obtained by using substituted products of alpha-alpha-diaminopyridine, or substituted products of p-arsanilic acid. Ortho or meta arsanilic acid or their substituted products may be used in the place of para-arsanilic acid. Therefore, it is not intended to limit the invention to the above described compounds.

What is claimed as new is:—

1. As a new article of manufacture, para-arsonic-acid-phenyl-azo-alpha-alpha-diaminopyridine, having the following formula:—

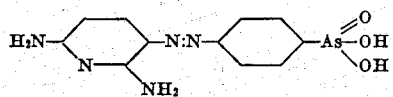

2. The method of obtaining arsonic acid substitution products of phenyl-azo-alpha-alpha-diaminopyridine, which consists in diazotizing p-arsanilic acid in an acid solution, and coupling the diazotized acid with alpha-alpha-diaminopyridine.

3. The method of obtaining arsonic acid substitution products of phenyl-azo-alpha-alpha-diaminopyridine, which consists in diazotizing p-arsanilic acid in an acid solution, and coupling the diazotized acid with alpha-alpha-diaminopyridine, dissolving the resulting acid salt in water, and precipitating the free base with an alkali solution.

4. The method of obtaining arsonic acid substitution products of phenyl-azo-alpha-alpha-diaminopyridine, which consists in diazotizing p-arsanilic acid in an acid solution, and coupling the diazotized acid with alpha-alpha-diaminopyridine, dissolving the resulting acid salt in water, precipitating the free base with an alkali solution, and precipitating the alkali salt with an excess of alkali.

5. The product obtained by coupling 2.6-diaminopyridine with diazotized para-aminophenylarsonic acid.

Signed at Yonkers in the county of New York and State of New York this 2nd day of May A. D. 1929.

EDMOND T. TISZA.
BERNARD JOOS.